United States Patent Office 3,054,796
Patented Sept. 18, 1962

3,054,796
MELAMINE PROCESS
Elton Fisher, John D. Christian, and Marcello T. Giachino, Memphis, Tenn., assignors to W. R. Grace & Co., New York, N.Y., a corporation of Connecticut
No Drawing. Filed July 18, 1960, Ser. No. 43,316
7 Claims. (Cl. 260—249.7)

This invention is directed to making melamine by bringing a vapor mixture of cyanic acid and ammonia into intimate contact with charcoal containing a phosphate material at a temperature of about 325°–450° C. and at substantially atmospheric pressure, whereby melamine is formed on the charcoal and is sublimed therefrom, condensed, and collected.

This is a continuation-in-part of our co-pending application Ser. No. 813,337, filed May 15, 1959, now abandoned.

The charcoals used as the base for treatment with phosphate materials as herein described are well known commercial materials. Among the charcoals that have proven eminently suitable as catalysts for the process of this invention are those prepared by calcining petroleum still residues (to make petroleum coke), wood, bone, coal, lignin liquor residue, pecan shells, lignite, and the like.

By "phosphate material" is meant any material, inorganic or organic, containing the P=O group, e.g., phosphoric acid (ortho, pyro, meta, and hypo), phosphorous acid (ortho, pyro, meta, and hypo) and the salts, esters, and amides of these acids.

As stated in co-pending application Serial Number 808,571, filed April 4, 1959, now abandoned, activated charcoal alone is an effective melamine catalyst. It is a peculiarity of charcoal that, while it can be promoted with a large number of materials to make it an even better melamine catalyst, the only promoters known that will activate charcoal to give yields of the order of 80–90% are the phosphate materials. The phosphate materials are outstanding in this respect, being markedly superior to all other materials tested, including a number of materials mentioned in the literature as catalysts for the synthesis of melamine. This discovery is particularly significant in view of the fact that it is taught that phosphoric acid, when acting catalytically, gives at most a 50% yield in the urea-to-melamine synthesis. (Vingee, U.S. Patent 2,550,659).

Phosphoric acid is not a promoter for most melamine catalysts of the adsorbent type. For example, it is relatively ineffective for silica gel (Davison grades 70 and 25) anhydrous calcium sulfate ("Drierite," 38% pore volume), crushed unglazed porcelain, and activated alumina, in some instances actually having the effect of reducing the yield as compared with results using these catalysts unpromoted with phosphoric acid, e.g., silica gel unpromoted gives typically 84% conversion, compared to 75% when promoted with phosphoric acid.

EXAMPLE 1

*Preparation of Catalyst*

In general, the charcoals used in the following examples were ground and screened to obtain a product passing a 20-mesh screen and retained on a 200 mesh screen. To treat this material with e.g., phosphoric acid, dilute phosphoric acid solution was made up by adding sufficient distilled water to 0.89 l. (1.5 kg.) of syrupy 85% $H_3PO_4$ to give 10 l. of solution. The aqueous acid mixture was poured slowly over a 20 kg. sample of the charcoal, with stirring to ensure thorough blending. (The amount of phosphoric acid or other phosphate material can be varied, depending on the percent phosphate material desired on the charcoal.) Immediately after the acid had been added, the mixture had a pasty consistency and appeared thoroughly wetted. As the mass was stirred a marked drying appeared to occur, and after about five minutes the mixture once again appeared to be a dry granular solid. The impregnated charcoal thus obtained was dried in an oven at 115° C. for 16 hours. It was then ready for use, as hereinafter described.

As thus prepared, the catalyst contains about 6% by weight of phosphoric acid. Charcoal containing as little as 0.1% and as much as 40–50% (or even more) phosphoric acid or other phosphate material is operable.

Prior to putting the phosphate material on the charcoal, the charcoal may be treated in various ways common in the art of activating charcoals, e.g., heated in a stream of hydrogen or ammonia or leached with acid, e.g., hydrofluoric acid or nitric acid. The intermediate step of leaching the charcoal with hydrofluoric acid prior to adding 6% phosphoric acid has been found to increase the yield of melamine several percentile points, e.g., 75% using charcoals leached with HF before adding $H_3PO_4$ as against 69% omitting the HF leach.

During the melamine reaction the phosphate material appears to undergo a chemical transformation. For example, if a charcoal catalyst promoted with 6% phosphoric acid is used for 32–48 hours, and then leached with boiling water, little or no phosphoric acid is extracted. This suggests that the phosphate material is converted to insoluble polyphosphates during the course of the reaction.

EXAMPLE 2

*Reactor and Its Operation*

To carry out the process using urea as a source of cyanic acid vapor, a vertical steel cylinder, 4 inches I.D. by 5 feet high, equipped with external electrical heaters is suitable as a fixed bed reactor. The top of the reaction cylinder is sealed off except for an inlet tube for molten urea through the top and a side arm at the top for introduction of ammonia sweep gas. About twenty inches down from the top is positioned a supported packing of carbon steel chips (the "decomposer"), maintained at a temperature high enough (suitably 350–475° C.) to decompose urea rapidly to ammonia and cyanic acid vapor. In about the middle of the lower third of the tube the phosphate material treated charcoal is positioned. It can be supported as a fixed bed, e.g., on a perforated plate. The bottom of the tube empties into a melamine collection vessel, the walls of which are suitably maintained at a temperature cool enough to condense melamine from the effluent vapors but hot enough to avoid condensation of ammonium carbamate, e.g., about 95° C. Condensed melamine product is periodically scraped from the walls of the collection vessel.

EXAMPLE 3

The catalyst was prepared by adding 6% $H_3PO_4$ to petroleum coke by the procedure of Example 1.

Using the apparatus described in Example 2, molten urea at about 150° C. was pumped at a rate of about 122 g./hour into the top of the reactor (run 3–A). Ammonia was fed to the side arm at a rate of 455 g./hour. The decomposer was maintained at 420° C. and the catalyst at 385° C. The catalyst weighed 1,460 g. at the start. After about 22 hours, during which time 2,753 g. of urea had been charged, the melamine product recovered weighed 296 g. and contained 77% melamine. The balance was mainly urea.

The operation was continued, using the same procedure except that the urea feed rate was adjusted to an average of 151 g./hour and the "decomposer" temperature was changed to 430° C. After about 168 hours (run 3–B), 25,302 g. urea had been charged and 9,982 g. product recovered, analyzing 75% melamine. This corresponds to a conversion of urea to melamine of about 84.5% of theoretical.

EXAMPLE 4

*Alternate Reactor and Its Operation*

Another series of runs was made in apparatus designed to use cyanuric acid as the source of cyanic acid feed. This was a 3-ft. section of 2″ carbon steel pipe. One end was threaded and equipped with a screw cap fitted with a quick opening gate valve. The unit was operated in a vertical position so that the capped end became the top of the reactor. An ammonia inlet port was also provided on the side of the cap of the pipe adjacent the cap. About 23 inches from the top of the reactor a retaining ring and perforated plate was placed on the inside of the pipe to support the catalyst bed. The exterior of the pipe was wrapped with insulated electrical resistance wire to heat the unit to the necessary reaction temperature. The heated portion extended from about 3 inches from the top to within 10 inches of the bottom. This lower (unheated) portion of the reactor stayed at a temperature (about 95° C.) low enough to permit the deposition of melamine. As used in this series, the top part of the tube (above the catalyst bed section) was kept at about 370° C. and the catalyst section at about 390° C. Crude cyanuric acid was fed to the top by dropping in 4-gram portions every thirty minutes. (The gate valve was opened and closed quickly to avoid loss of material.) Ammonia sweep gas was fed at 56 g./hour.

EXAMPLE 5

Petroleum coke charcoal containing 6% $H_3PO_4$ (total, 163 g.) was used as the catalyst, prepared as described in Example 1. The catalyst was left in the reactor for all the runs. The apparatus and procedure of Example 4 were used.

The first run (run 5-A) ran 15½ hours and used 124 g. crude cyanuric acid. The product weighed 36 g. and analyzed 76% melamine.

The operation was resumed (run 5-B) for another 30 hours, using 240 g. crude cyanuric acid and giving 125 g. of product analyzing 87.4% melamine.

The operation was then continued (run 5-C) for another 15 hours, using 120 g. crude cyanuric acid and giving 74 g. of product analyzing 80% melamine.

In the next run (run 5-D) 120 g. crude cyanuric acid was charged over a 15-hour period; the product weighed 71 g. and analyzed 88% melamine.

Urea appeared in varying amounts in all the run products. Overall, for these four runs, 604 g. of cyanuric acid was used, to give a total melamine yield of 258 g. or 79% of theory.

EXAMPLE 6

A further series of runs was made, using the apparatus and general procedure of Example 4, with differences as herein noted. The petroleum coke charcoal base contained 2% $H_3PO_4$; 191 g. of this catalyst was used. The decomposer section was maintained at about 435° C. and the catalyst bed section at about 390° C. In the first run (run 6-A), 124 g. crude cyanuric acid was added in 15½ hours, giving 34 g. of product analyzing 86% melamine and 9.4% urea. In the next run (run 6-B), 128 g. crude cyanuric acid was added in 16 hours to give 60 g. product analyzing 85% melamine and 11.5% urea; in the third and final run (run 6-C) 128 g. crude cyanuric acid was added in 16 hours to give 71 g. product analyzing 86% melamine and 12.7% urea. Thus a total of 380 g. crude cyanuric acid gave a total of 141.2 g. melamine, or 69% of theory.

EXAMPLE 7

In another series of runs the charcoal catalyst (petroleum coke) was treated with $KH_2PO_4$. First, the charcoal was washed with dilute nitric acid to remove inorganic salts ($K_2CO_3$, $CaCl_2$, $CaSO_4$, $FeCl_2$) left in the material by the initial charring process. After this treatment, the charcoal was dried and treated with an aqueous solution of $KH_2PO_4$ to provide 9.4% by weight of $KH_2PO_4$, after drying. 197 g. of this material was used as the catalyst using the apparatus and procedure of Example 4. Four 16-hour runs were made, in each case using 128 g. crude cyanuric acid feed. The weights of melamine-containing products were respectively 31, 65, 57, and 66 g. The melamine analysis ranged from 71 to 91%. The overall conversion for the series was 69%.

EXAMPLE 8

Another series of runs was made using a catalyst prepared as in the preceding example, except that the charcoal was treated with $K_3PO_4$ in an amount stoichiometrically equivalent to 6% $H_3PO_4$. Apparatus and procedure were as in Example 7, and yields were comparable.

General

The amount of ammonia (in relation to cyanic acid feed) is not critical, but some must be added to assist in the removal of the product from the catalyst. Suitably, the amount of total ammonia (including that made when making cyanic acid from urea) is 1–10 g./g. cyanic acid. As shown in the foregoing examples, excellent results are obtained at $NH_3$:HNCO weight ratios of 5–7:1. In general, we prefer to work with a space-time-yield between 0.03 and 0.3 where space-time-yield is expressed as grams of melamine per gram of catalyst per hour. The catalyst, far from being destroyed by the reaction, improves with use, and a given portion of catalyst can be used to produce thousands of times its weight of melamine without perceptible change (except to become gradually more effective).

For best results, air and oxygen are excluded from the unit, since oxygen appears to have a detrimental effect on the reaction. Water vapor is also preferably absent, since it hydrolyzes cyanic acid to ammonia and carbon dioxide. The small amount of closely-held water on the catalyst at start-up is gradually removed by the aforesaid hydrolytic reaction.

The overall reaction of our proces is expressed by the equation:

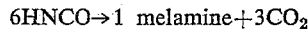

According to some authorities, cyanic acid has the "iso" form, HNCO, when in the vapor phase.

Small amounts of urea generally show up in the products, presumably by recombination of ammonia and cyanic acid present in the gases leaving the catalyst. Cyanuric acid, ammelide, melam, etc. may also appear. If desired, the crude melamine product can be purified by any conventional means, e.g., by crystallization from boiling water, treatment with dilute sodium hydroxide solution, and the like.

The reaction is not dependent on pressure. To get melamine out of the reactor it is merely necessary that the pressure on the feed side of the catalyst bed be higher than the pressure on the effluent side of the bed, so that the ammonia will be forced to sweep through the bed and thereby sublime out the adsorbed melamine. The simplest way to achieve this pressure differential is to let the effluent exit at atmospheric pressure and to adjust the charge rate (of cyanic acid and ammonia) to provide a pressure ante the catalyst bed of 2–6 atmospheres. (In Example 3, the fore-part of the reactor was kept at about 30 p.s.i.g.)

The conversion of cyanic acid to melamine has been found to be mildly exothermic. Accordingly, no heat need be supplied to the catalyst if the cyanic acid vapor feed is preheated to a melamine forming temperature (e.g., at least about 350° C.). Depending on the size of the catalyst bed, it may be necessary to insulate to prevent undue heat loss or to cool to prevent overheating.

Even the best and most active charcoals are improved by the addition of phosphate material, for example, as shown in the following table. In these runs, the apparatus and conditions of Example 4 were used.

| Example | Charcoal Source | Brand Name | Percent Conversion without $H_3PO_4$ | | | | Percent Conversion with 6% $H_3PO_4$ on charcoal | | | |
|---|---|---|---|---|---|---|---|---|---|---|
| | | | 16-hour period | | | Cumulative | 16-hour period | | | Cumulative |
| | | | 1 | 2 | 3 | | 1 | 2 | 3 | |
| 9 | Lignin liquor residue. | Nuchar C | 34 | 49 | 83 | 55 | 51 | 78 | 87 | 72 |
| 10 | Lignite coke | Atlas Darco S-51 | 33 | 54 | 71 | 53 | 50 | 60 | 92 | 76 |
| 11 | Bone black | H. L. Baugh | 49 | 81 | 62 | 64 | 58 | 83 | 74 | 72 |
| 12 | Wood | Atlas Darco G-60 | 29 | 47 | 58 | 45 | 53 | 71 | 92 | 72 |
| 13 | Pecan shell [1] | Barneby-Cheney PC-5. | 51 | 52 | 60 | [2] 44 | 61 | 70 | 82 | [2] 60 |
| 14 | Coal coke | Pittsburgh CAL | 26 | 40 | 50 | 39 | 43 | 77 | 102 | 74 |
| 15 | Natural gas | Cabot Black Pearls 2. | 9 | 22 | 44 | 24 | 31 | 81 | 81 | 64 |

[1] Data reported are for the 3rd, 4th, and 5th periods, respectively.
[2] Cumulative for the 5 periods.

A great many melamine catalysts have been proposed in the literature, and in the course of our research we have tried most of these with charcoal. As a result of our experiments we have concluded that the phosphate materials are unsurpassed as promoters for charcoal in the cyanic acid-melamine synthesis. We base this conclusion on work described below.

In one series of runs a plain unactivated petroleum coke charcoal (Columbia SXAC) was treated with various promoters to determine their respective effects. The apparatus and procedure used were those described in Example 4. The conversions in the third 16-hour operating period are given in the table following:

| Example | Phosphate material catalysts | Percent Conversion | Literature Ref. |
|---|---|---|---|
| 16 | 6% $H_3PO_4$ | 92 | |
| 17 | 6% $H_3PO_3$ | 88 | |
| 18 | $Li_3PO_4$ [1] | 87 | |
| 19 | $FePO_4$ [1] | 73 | |
| 20 | $AlPO_4$ [1] | 83 | |
| 21 | $Pb_3(PO_4)_2$ [1] | 74 | |
| 22 | $Sn_3(PO_4)_2$ [1] | [2] 72 | |
| 23 | 6% tributyl phosphate | 90 | |
| 24 | 6% hexamethylphosphoramide | 80 | |
| Other known melamine catalysts | | | |
| 25 | 5% $ZnCl_2$ | [14] 20 | ([3][4][5]). |
| 26 | 11% $NH_4Cl$ | [14] 27 | ([3][5][6][7][8]). |
| 27 | 0.9% MgO | 53 | ([9]). |
| 28 | 6% $H_3BO_3$ | 54 | ([10][11]). |
| 29 | 6% $H_2SO_4$ | 53 | ([3][5][8][12]). |
| 30 | 4.8% LiCl | 48 | ([3][5][13]). |
| 31 | 6% $NH_4HF_2$ | 34 | ([6][7][13]). |
| 32 | 8% Cu | [14] 12 | ([9]). |
| 33 | 1% Sn | 45 | ([9]). |
| 34 | 0.5% Metal oxides ($Fe_2O_3$, $Al_2O_3$, CaO, MgO). | [2] 29 | ([9]). |

[1] Equivalent to 6% $H_3PO_4$.
[2] 2nd 16-hour period.
[3] U.S. Patent 2,550,659.
[4] U.S. Patent 2,265,824.
[5] U.S. Patent 2,776,286.
[6] U.S. Patent 2,499,373.
[7] U.S. Patent 2,819,265.
[8] U.S. Patent 2,776,285.
[9] British Patent 754,720.
[10] U.S. Patent 2,857,381.
[11] Canadian Patent 561,303.
[12] U.S. Patent 2,649,446.
[13] U.S. Patent 2,776,285.
[14] Run was for 16 hours.

In carrying out Example 17 of the foregoing table, a variation was tried in preconditioning the catalyst, in the following way. The apparatus and procedure of Example 4 was used. In this series of runs a 308 ml. (182 g.) portion of petroleum coke charcoal impregnated with 6% phosphorous acid ($H_3PO_3$) was charged into the catalyst chamber. This catalyst was conditioned by heating at 385–400° C. for 16 hrs. (after adding 4 g. of crude cyanuric acid to the reactor) while passing a stream of ammonia (56 g./hr.) through the unit. Subsequent to this conditioning, the lower end of the reactor (melamine receiver) was scraped out, and the product was discarded before starting the first run of a series. Crude cyanuric acid was fed to the top by dropping a 4 g. portion through the gate valve every 30 min. The gate valve was opened and closed quickly to avoid loss of vapor. Ammonia sweep gas was fed at 56 g./hr. A series of three consecutive 16 hr. runs was made. A total of 128 g. crude cyanuric acid was fed during each run of this series. Product was removed after each run, freed of most of its carbamate by heating, cooled, weighed and analyzed.

| Run No. | Product Weight, g. | Melamine Content, Percent | Conversion, Percent of Theory |
|---|---|---|---|
| 1 | 18 | 86 | 22 |
| 2 | 54 | 87 | 68 |
| 3 | 65 | 93 | 88 |

These data correspond to a three run conversion of 59%.

In addition to the phosphate materials already mentioned, the following are suitable, and can be added to the charcoal base using the technique of Example 1.

Permonophosphoric acid—$H_3PO_5$
Perdiphosphoric acid—$H_2P_2O_8$
Phosphorus trioxide—$P_2O_3$
Phosphorus tetraoxide—$P_2O_4$
Phosphorus pentoxide—$P_2O_5$
Phosphorus oxybromide—$POBr_3$
Phosphorus oxychloride—$POCl_3$
Pyrophosphoryl chloride—$P_2O_3Cl_4$
Metaphosphoryl chloride—$PO_2Cl$
Monofluophosphoric acid—$H_2PO_3F$
Difluophosphoric acid—$HPO_2F_2$
Phosphorous diamide—$HOP(NH_2)_2$
Phosphine oxide—$H_3PO$
The mono-, di- and tri-alkyl phosphine oxides Methylethylphenylphosphine oxide $$CH_3-\underset{\underset{C_6H_5}{|}}{\overset{\overset{C_2H_5}{|}}{P}}O$$

Phenyl-β-naphthylphosphoryl-l-menthylamide.

$$\begin{array}{c} NC_{10}H_{19}(l) \\ | \\ C_6H_5OPO \\ | \\ O \\ | \\ C_{10}H_7(\beta) \end{array}$$

Ethyltriphenylmethylpyrophosphonate $$(C_6H_5)_3C\underset{\underset{O}{\|}}{\overset{\overset{OC_2H_5}{|}}{P}}-O-\underset{\underset{O}{\|}}{\overset{\overset{OC_2H_5}{|}}{P}}C(C_6H_5)_3$$

Ethyltriphenylmethylpyrophosphonic acid.

$$(C_6H_5)_3C\underset{\underset{O}{\|}}{\overset{\overset{H}{\underset{|}{O}}}{P}}-O-\underset{\underset{O}{\|}}{\overset{\overset{H}{\underset{|}{O}}}{P}}C(C_6H_5)_3$$

Styrylphosphinic acid—$C_6H_5CH=CHPO_3H_2$
Dimethylphosphinic acid—$(CH_3)_2PO_2H$
Phosphobenzene—$C_6H_5PO_2$ Phosphoroxybenzene—$C_6H_5\overset{\underset{\uparrow}{O}}{P}=PC_6H_5$
Triethylphosphine oxide—$(C_2H_5)_3PO$
Diethylphosphinic acid—$(C_2H_5)_2PO_2H$
Hydroxyethylphosphonic acid—$CH_3C(OH)HPO_3H_2$
Tetraethylphosphonium hydroxide—$P(C_2H_5)_4OH$
Tetramethylphosphonium hydroxide—$P(CH_3)_4OH$
Hexamethylphosphoramide—$((CH_3)_2N)_3PO$
Tributyl phosphate—$(CH_3CH_2CH_2CH_2)_3PO_4$
Phenylphosphonic diamide—$C_6H_5P(O)(NH_2)_2$
Phenylphosphonic dichloride—$C_6H_5P(O)Cl_2$ Certain material in this specification is part of the subject matter of copending application Ser. No. 53,617, filed September 2, 1960.

Where "crude cyanuric acid" is used as feed in these examples, the term refers to cyanuric acid containing minor amounts of ammelide, biuret, and urea. Whereas 100 g. pure cyanuric will give (theoretically) 47.4 g. melamine, 100 g. of the crude cyanuric acid used herein will give theoretically 54 g. melamine, mainly on account of its ammelide content, and the latter standard is used in calculating yields wherever the feed is crude cyanuric acid.

While the foregoing examples deal with a fixed bed of charcoal, other types of catalyst beds are suitable, including fluidized and semi-fluidized beds as shown, for example, using silica gel in U.S. Patent No. 2,760,961.

We claim:

1. In the synthesis of melamine from ammonia and cyanic acid on a catalyst at temperature of 325–450° C. and at superatmospheric pressures up to about 6 atmospheres in which melamine is formed on the catalyst and is sublimed therefrom, condensed, and recovered, the improvement consisting of using a catalyst consisting essentially of charcoal having adsorbed thereon a phosphate material, the phosphate material being 0.1–50% by weight of the charcoal.

2. The method according to claim 1 in which the ammonia:cyanic acid weight ratio is about 5–7:1 and the synthesis temperature is about 390° C.

3. The method according to claim 1 in which the charcoal is selected from the group consisting of petroleum coke, wood charcoal, bone charcoal, coal coke, lignin liquor residue charcoal, pecan shell charcoal, and lignite charcoal; and the phosphate material is selected from the group consisting of phosphoric acid, phosphorous acid, potassium phosphate, lithium phosphate, iron phosphate, aluminum phosphate, lead phosphate, tin phosphate, tributyl phosphate, and hexamethylphosphoramide.

4. The method according to claim 1 in which the charcoal is petroleum coke.

5. The method according to claim 4 in which the phosphate material is about 6% by weight of the charcoal.

6. The method according to claim 5 in which the phosphate material is phosphoric acid.

7. The method according to claim 5 in which the phosphate material is phosphorous acid.

References Cited in the file of this patent

UNITED STATES PATENTS

| | | |
|---|---|---|
| 2,615,019 | Klapproth | Oct. 21, 1952 |
| 2,776,286 | Lobdell | Jan. 1, 1957 |

FOREIGN PATENTS

| | | |
|---|---|---|
| 560,215 | Canada | July 8, 1958 |
| 718,934 | Great Britain | Nov. 24, 1954 |
| 767,344 | Great Britain | Jan. 30, 1957 |
| 803,195 | Great Britain | Oct. 22, 1958 |
| 1,531 | Japan | Mar. 27, 1957 |

UNITED STATES PATENT OFFICE
CERTIFICATE OF CORRECTION

Patent No. 3,054,796  September 18, 1962

Elton Fisher et al.

It is hereby certified that error appears in the above numbered patent requiring correction and that the said Letters Patent should read as corrected below.

Columns 5 and 6, last column, second figure thereof, for "76" read -- 67 --; column 6, line 70, a subscript "3" should terminate the formula.

Signed and sealed this 15th day of January 1963.

(SEAL)
Attest:

ERNEST W. SWIDER
Attesting Officer

DAVID L. LADD
Commissioner of Patents